Nov. 18, 1952      W. GATERMAN, SR      2,618,114
DIVIDER ATTACHMENT FOR MOWERS
Filed June 16, 1950
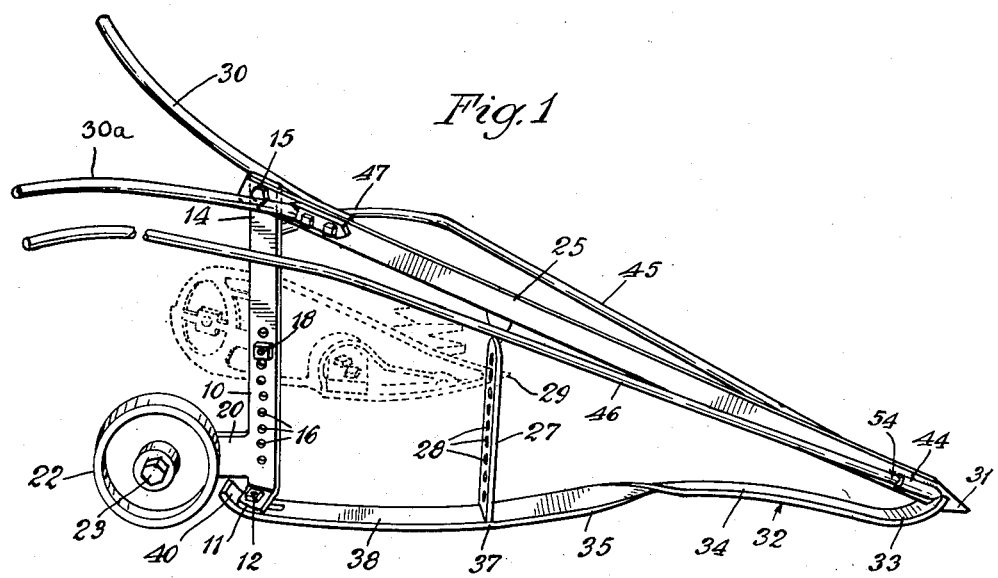
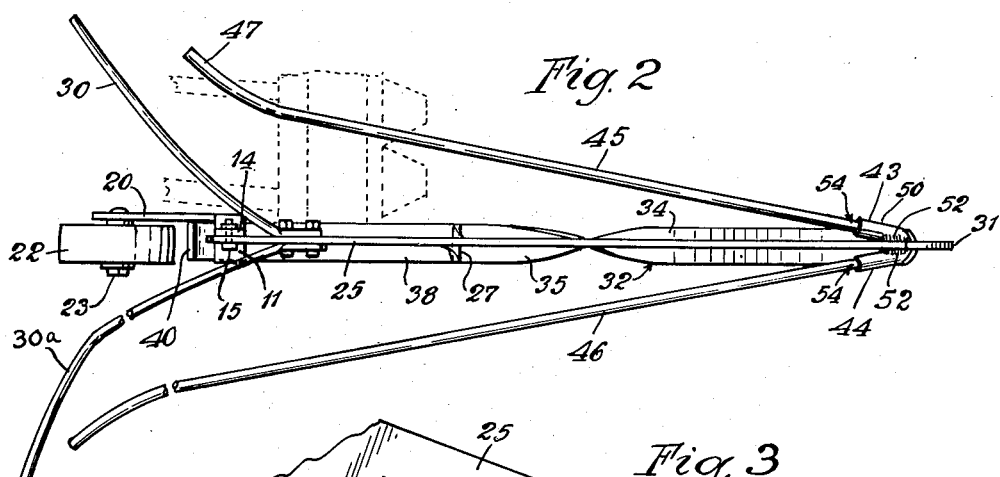
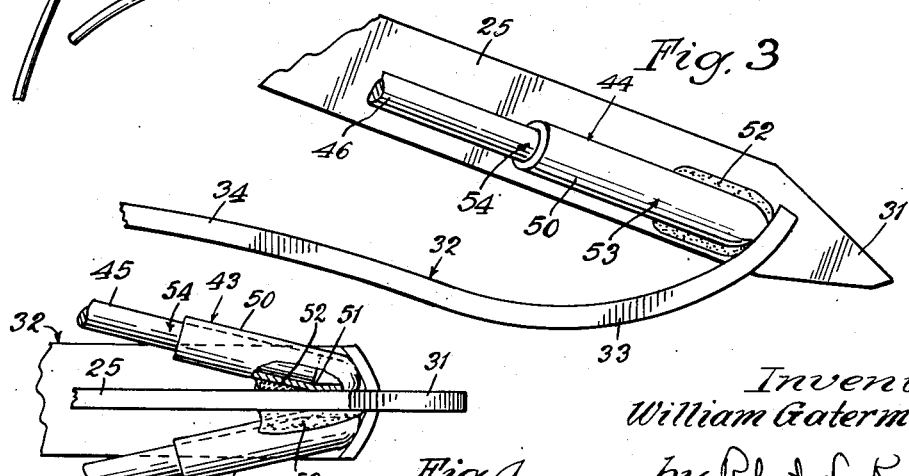
Inventor
William Gaterman, Sr.
by Robert L. Kahn
Attorney Patented Nov. 18, 1952

2,618,114

UNITED STATES PATENT OFFICE 2,618,114

DIVIDER ATTACHMENT FOR MOWERS

William Gaterman, Sr., Manitowoc, Wis., assignor to Gaterman Mfg. Company, Manitowoc, Wis., a partnership Application June 16, 1950, Serial No. 168,535

14 Claims. (Cl. 56—314)

This device relates to a divider attachment for farm mowers, combines or harvesters particularly those used in mowing grain, hay or seed crop and the like. As is well known, a mower is moved through a standing field of grain or other crop and cuts a swath of grain depending upon the size of the mower. Considerable difficulty has been experienced in these machines at the sides of the mowers where the swath of cut grain ends and standing uncut grain begins.

As a rule, attachments for mowers have been provided which purport to divide the swath from the standing grain. Such devices have had various drawbacks. Thus, many devices tend to tear up the ground or have a short life and ruin a certain amount of the plants. Other attachments fail to divide the cut from the uncut crop along a predetermined path followed by the divider and thus result in a certain amount of loss of crop. Still other dividers are critical of the height of the uncut crop and require precise harvesting conditions. Many attachments of the prior art under field conditions frequently fail because of mechanical difficulties.

This invention provides a construction which is simple to manufacture and assemble and may be adjusted by the user to suit individual conditions. A device embodying the present invention may be attached to any of the well-established makes of farm mowers or harvesting machines and may be quickly and simply adjusted to suit different crop and ground conditions. By virtue of the invention, a divider is provided which makes it possible to mow and save grain and seed or harvest in a faster and cleaner manner than has hitherto been considered possible.

A divider embodying the present invention picks up the crop ahead of it, divides the crop and elevates the portion of the crop in the path of the harvester so that the cutter or sickle may operate upon the grain most effectively and efficiently. By virtue of this invention, a divider may be used on uneven ground without fear of damage to the divider.

A device embodying the present invention may be used in a variety of ways to operate on various kinds of crops, both high and low. An important feature of the invention resides in the structural details whereby the regions subjected to the greatest vibration and elastic stress have their elasticity and strength unimpaired during the manufacture of the divider so that the divider may have a long useful life.

In order that the invention may be understood, it will now be explained in connection with the drawings wherein Figure 1 is a side elevation of an attachment embodying the invention, the dotted lines showing a part of a conventional harvester to which the attachment is applied. Figure 2 is a top plan view of the attachment. Figure 3 is an enlarged side view of the front of the attachment. Figure 4 is a top plan view of the front of the attachment.

Referring now to the drawings, base bar 10 of heavy gauge iron is provided. Bar 10 has bottom 11 bent at right angles thereto and is bolted at 12 to a bottom shoe to be described later. Base bar 10 has top 14 bolted at 15 to a part of the divider.

Base bar 10 is provided with a series of apertures 16, any one or more of which may be used as a mounting aperture upon a suitable portion of a harvesting machine such as the cutting bar. Thus as shown, bolt 18 passing through one of the apertures of base bar 10 supports the base bar in a generally vertical position at a predetermined height above ground.

Base bar 10 near the bottom has an L portion 20 upon which may be secured wheel 22 rotatively mounted upon axle 23 carried by the L. Base bar 10 is offset so that wheel 22 tracks the point of the attachment. In certain cases it may be desirable to remove or omit wheel 22 and to that end, the mounting for the wheel is preferably so devised as to permit ready removal or replacement of the wheel. Means may be provided for adjusting the height of wheel 20 for loose or wet ground.

Bolted at 15 to base bar 10 is upper bar 25 preferably consisting of a strip of flat iron rod. Bar 25 is generally straight and, as shown in Figure 1, is mounted in a generally vertical plane but extending or pointing downwardly toward the front. At an intermediate portion of bar 25, cross piece 27 is provided, this cross piece being welded or otherwise attached to bar 25. Cross piece 27 is of flat stock and twisted so that most of the length of cross piece 27 lies in a plane generally perpendicular to the plane in which bar 25 lies but still in a vertical plane. Cross piece 27 is provided with a series of apertures 28 into which shoe 29 of a harvesting or threshing machine may project. By proper selection of the points of support in cross piece 27 and base bar 10, any desired elevation for the attachment may be provided.

Tail guide 30 is bolted at the upper end of upper bar 25. This guide loosens stems or vines on top of the cut crop and separates uncut tangled crop. It may be removed when operating in short crops. Tail guide 30a is also bolted to bar 25 and guides loose ends of uncut crop on top of uncut crop.

Bar 25 terminates in hardened point 31. Point 31 is normally adapted to ride just above the surface of the ground. Just back of point 31, bottom bar 32 is attached, this bar extending rearwardly of the divider attachment to bolt 12. Bottom bar 32 is formed of flat spring steel and is shaped as shown. Thus bar 32 has bowed portion 33 slotted to accommodate bar 25 immediately behind point 31, portion 33 extending downwardly below the level of a line extending between the bottom of wheel 22 and the extreme tip of point 31.

Bar 32 continues rearwardly and upwardly from part 33 to form spring portion 34. From portion 34, the bar extends rearwardly but is twisted about 180 degrees at portion 35. Beyond portion 35 bar 32 continues rearwardly, being joined to the bottom of cross piece 27 at region 37, and continuing rearwardly as portion 38 to end bolt 12. The very rear end of bar 32 is bent upwardly as shown at 40.

Portion 33 of bottom bar 32 functions as a runner to permit the bar to run along the ground and ride on such rough and irregular objects as stones and the like. It will be noted that bottom bar 32 extends rearwardly in a generally straight line with the path of wheel 22 being in line with the bottom bar.

Near and somewhat to the rear of tip 31, there are attached in any suitable manner, ends 43 and 44 of wing members 45 and 46. These wing members extend upwardly but diverge from top bar 25, the two wing members being generally formed of iron rod or tubing and adapted to be bent to suit conditions. Wing member 45 extends rearwardly toward base bar 10 and then is bent at 47 away from upper bar 25 and well toward the mowing or harvesting machine and droops to release crop material. Wing 47 extends away from upper bar 25 and over the uncut crop. It is understood that the plane generally defined by upper and lower bars 25 and 38 marks the plane of cleavage between the cut and uncut grain or crop.

Referring now to Figure 3, a detailed description of the construction of the part of the divider adjacent point 31 follows:

Referring to wings 45 and 46, each wing is formed of round steel rod, the end portion of the rod being disposed in a length of steel tubing 50. Tubing 50 and the rod, such as 46 for example, are bent at 51 so that a portion of the rod and tubing lie flush against the side of top bar 25. In this condition, the tubing is welded to the side of the top bar. Bent portion 51 permits the rod and tubing to extend outwardly away from the side of the top bar as shown in the drawings.

The extent of welding zone 52 is indicated in the drawing and in practice it is found that part 53 of the tubing develops a hard, brittle spot. In prior art devices, any wings or parts of an attachment or mower have generally failed near the region of welding. As is well understood, these wings are subject to considerable flexing and vibration and because of this, crystallization of the metal is apt to occur at the hard spot. As a result of the invention, the wing rod which vibrates is maintained in a strong condition and can readily withstand normal use. It is customary for an operator to adjust the wings and bend them to his desired requirements. Hence wings 45 and 46 are subject to hard usage. The flexing point for the wings is at region 54 where the rod emerges from the tube and since this point is quite distant from the weld it will be seen that the strength of the wing is unimpaired at the regions where it is required.

In operation, the attachment is pushed or moved forwardly with point 31 well in advance of the sickle or other cutters on the mowing machine. During the travel of the attachment along the ground, spring portion 42 runs over uneven ground, prevents digging into the ground and tends to take up the shock of hitting stones and other hard objects in a field. Part 34 of the bottom bar provides a spring action while twisted portion 35 functions in several different ways. Thus, the twisted part has the twist as shown, namely in a counter-clockwise direction as seen from the front. Thus an additional crop parting action is provided as twisted portion 35 tends to move uncut crop outwardly away from the swath so that such uncut crop may be operated upon at the next trip of the harvesting machine and divider. Furthermore, this twisted portion provides a highly elastic bottom bar portion and permits point 31, wings 45 and 46 and tail guide 39 to vibrate and flex in all directions. Thus these parts are enabled to go under or through cut or uncut crop, avoids trash and provides a cleaner action. In addition, the twisted portion endows the bottom bar with substantial elasticity enabling the divider to withstand shock and abuse and excessive stresses and strains, particularly at the regions where different parts are welded together.

It will be apparent that the general construction of the divider provides a box type which makes for strength while permitting the use of light weight parts. The arrangement of the wings is such that the vertical bars even though provided with numerous apertures will not clog with cut or uncut crop.

The divider embodying the present invention may be used in combination with a windrower of a combine binder, forage harvester, mower or as a substitute for a grass board and subsole on the outer shoe of a mowing machine. It may be used in a variety of other ways and may be readily understood.

Apertured parts 14 and 27 make it possible to provide a vertical tilting adjustment of front 31 to fit different style machines and also for meeting different harvesting conditions. It is also possible to provide vertical adjustment of the cutting bar of the harvester, this being shown in dotted lines, so that different length of stubble or crops may be handled.

Pointed portion 31 may comprise a separate removable part which may be bolted to the attachment if desired. It is also possible to bolt wings 45 and 46 at 52 rather than weld the same.

What is claimed is:

1. A divider attachment for use with a harvesting machine or the like and adapted to define an outer extremity of a swath, said attachment comprising a generally triangular shaped frame adapted to lie on its side in a generally vertical plane, said frame having a pointed tip portion at the apex, said tip portion being the front of the attachment, said frame having the lower portion thereof and tip portion normally riding along the ground and having the upper portion extending from the tip portion rearwardly and upwardly, said frame having a cross piece joining the ends of the upper and lower frame portions and being generally vertical, said frame having an intermediate supporting cross piece generally parallel to the first cross piece, flexible wing members extending from the forward tip of the frame rearwardly and bent away on opposite sides from the plane of the frame but being adapted to be shaped to suit conditions, said attachment being attached to a harvester at the two generally parallel vertical cross pieces.

2. An attachment for harvesting machines adapted to define one edge of a swath, said attachment comprising a generally triangular frame lying normally in a generally vertical plane with the tip defining a forward edge adapted to ride near the ground, said frame having top and bottom portions extending from the tip rearwardly, said bottom portion extending generally along the ground and top portion extending upwardly away from the ground, two spaced parallel cross pieces joining the top and bottom portions and defining the frame, said spaced pieces being generally vertical with one of said pieces forming the rear of the frame, wing members of generally rod-like shape extending from the tip of the attachment rearwardly thereof, said wing members being flexible and being adapted to be shaped, a wheel attached to the vertical cross piece at the rear frame, said wheel riding in the track of the bottom portion, said frame being adapted to be supported at the two spaced parallel cross pieces.

3. The structure according to claim 2 wherein said bottom portion consists of a flat band having an intermediate part between the tip and first supporting cross piece bent upwardly away from the ground so that the tip portion may ride over uneven ground.

4. The structure according to claim 2 wherein said bottom portion consists of a flat band having an intermediate part between the tip and first cross piece spaced upwardly to clear the ground and twisted so that when disposed to define the right edge of a swath, said bottom portion travels along the edge of the cut and uncut crop and tends to effect a more complete separation.

5. The attachment according to claim 2 wherein said bottom portion consists of a flat strip having an intermediate part between the pointed tip and first cross piece bent upwardly from the ground and twisted substantially 180 degrees in a counter-clockwise direction as seen from the front and extending toward the rear and a wheel attached to the rear cross piece, said wheel riding in the track of said bottom portion.

6. The structure according to claim 2 wherein said bottom portion consists of a flat band having an intermediate part between the tip and first cross piece to clear the ground and twisted so as to provide an all direction flexing, bending and vibrating location whereby the front end of the attachment goes through tangled crop, and resists breakage by bending and vibrates to further aid in loosening cut and uncut crop.

7. The attachment according to claim 2 wherein the tip portion of the attachment has a pointed part with the top and bottom portions welded together just behind the tip and wherein the wing members are also welded at the same place as the bottom portion, said wing members near the joint consisting of a length of tubing with the rod-shaped wing members disposed inside of the tubing, said tubing and rod being welded to the top and bottom portions just in back of the tip and said tubing extending rearwardly for a distance to provide a support for each wing member.

8. An attachment for harvesting machines for defining an edge of a swath, said attachment comprising a generally triangular-shaped metal frame adapted to lie in a generally vertical plane, said frame having a bottom portion of flat stock, a top portion carrying a pointed tip and welded to said bottom portion just back of the tip, two generally parallel cross pieces extending between the top and bottom portions and being generally vertical, said two cross pieces having a series of apertures therethrough and said attachment adapted to be mounted at these apertures on a harvester machine, said bottom portion being bent upwardly between the tip of the attachment and the first cross piece and also being twisted substantially 180 degrees, the twist being such that when the attachment is moved forwardly, said bottom portion tends to guide uncut crop outwardly from the swath, a pair of wing members welded to said tip portion at the rear of said point, said wing members extending rearwardly of the attachment, each wind member consisting of a length of steel tubing and a rod disposed in said tubing, said tubing extending for a distance from the weld along the wing member with rods extending beyond the tubing and forming the major portion of the wing member, said rods being flexible and adapted to be shaped to suit individual requirements.

9. The structure according to claim 8 wherein two tail guides are provided, each tail guide consisting of a flexible strip attached to the rear end of the top portion.

10. The attachment according to claim 8 wherein at least one tail guide is provided, said tail guide consisting of a flexible strip of metal attached to the rear end of the top portion and wherein a wheel is attached near the bottom of the second cross piece, said wheel tracking the bottom portion.

11. The attachment according to claim 8 wherein said bottom portion is slotted and extends upwardly on both sides of the top portion at the tip portion of the attachment, said top portion having the pointed portion extending downwardly to pick up the crop while the upwardly extending parts on both sides of the top portion prevent the attachment from digging into the ground.

12. The attachment according to claim 8 wherein said bottom portion is slotted and extends upwardly on both sides of the top portion to provide an additional upwardly directed runner-shoe edge to avoid digging in, said top portion being pointed and extending downwardly to pick up the crop, a wheel attached near the bottom of said second cross piece, said wheel tracking behind the bottom portion.

13. An attachment for harvesting machines, said attachment comprising a generally triangular-shaped metal frame adapted to lie in a generally vertical plane, said frame having a bottom portion of flat stock, a top portion carrying a pointed tip, means for rigidly attaching said bottom and top portions at a point just back of the pointed tip, two generally parallel cross pieces extending between the top and bottom portions and being generally vertical, said two cross pieces having a series of apertures therethrough and said attachment adapted to be mounted at these apertures on a harvester machine or the like, said bottom portion being bent upwardly between the tip of the attachment and the first cross piece and also being twisted substantially 180 degrees, the twist being such that when the attachment is moved forwardly, said bottom portion tends to guide uncut crop outwardly from the swath and a pair of wing members attached to said tip portion rearwardly of said point, said wing members extending upwardly and rearwardly of the attachment.

14. The attachment, according to claim 13, wherein each wing member consists of a length of steel tubing and a rod disposed in said tubing, said tubing extending from the point of attachment for a short distance along the rods.

WILLIAM GATERMAN, Sr.

REFERENCES CITED

The following references are of record in the file of this patent:

UNITED STATES PATENTS

| Number | Name | Date |
|---|---|---|
| 607,704 | Pitcher | July 19, 1898 |
| 999,452 | Honey | Aug. 1, 1911 |